(12) United States Patent
Lu

(10) Patent No.: US 11,252,808 B2
(45) Date of Patent: Feb. 15, 2022

(54) CONNECTORS AND WIRELESS CONTROLLERS FOR WIRED LIGHTING SYSTEMS

(71) Applicant: FJP Solution LLC, Chino, CA (US)

(72) Inventor: Fang Lu, Chino Hills, CA (US)

(73) Assignee: FJP Solution LLC, Chino, CA (US)

( * ) Notice: Subject to any disclaimer, the term of this patent is extended or adjusted under 35 U.S.C. 154(b) by 49 days.

(21) Appl. No.: 16/869,301

(22) Filed: May 7, 2020

(65) Prior Publication Data

US 2021/0352795 A1 Nov. 11, 2021

(51) Int. Cl.
| | |
|---|---|
| *H05B 47/19* | (2020.01) |
| *F21V 23/04* | (2006.01) |
| *F21V 23/06* | (2006.01) |
| *F21W 131/109* | (2006.01) |
| *H05B 47/115* | (2020.01) |
| *H05B 47/155* | (2020.01) |

(52) U.S. Cl.
CPC ......... *H05B 47/19* (2020.01); *F21V 23/0435* (2013.01); *F21V 23/0471* (2013.01); *F21V 23/06* (2013.01); *H05B 47/115* (2020.01); *H05B 47/155* (2020.01); *F21W 2131/109* (2013.01)

(58) Field of Classification Search
CPC .. F21V 23/06; F21V 23/0435; F21V 23/0471; F21V 23/0485; H05B 47/19; H05B 47/115; H05B 47/155
See application file for complete search history.

(56) References Cited

U.S. PATENT DOCUMENTS

| | | | | |
|---|---|---|---|---|
| 5,679,023 A * | 10/1997 | Anderson, Jr. | ...... | H01R 25/162 362/147 |
| 5,855,491 A * | 1/1999 | Hintner | ................... | H02B 1/205 439/409 |
| 6,017,241 A * | 1/2000 | Komai | ................. | H01R 4/2404 439/419 |
| 6,067,762 A * | 5/2000 | Greer | ................... | A47B 57/425 52/220.7 |
| 8,172,589 B2 * | 5/2012 | Johnson | ................... | H02G 3/38 439/215 |
| 9,345,155 B1 | 5/2016 | Schmuckle | | |
| 9,526,152 B1 | 12/2016 | Toomey et al. | | |
| 9,859,663 B2 | 1/2018 | Sparrowhawk et al. | | |
| 9,945,538 B2 | 4/2018 | Beausoleil | | |
| 10,190,761 B1 * | 1/2019 | Winters | ................ | F21V 23/001 |
| 10,299,342 B1 | 5/2019 | Reddy et al. | | |

(Continued)

FOREIGN PATENT DOCUMENTS

| | | |
|---|---|---|
| WO | 2013012826 A1 | 1/2013 |
| WO | 2015002792 A1 | 1/2015 |

*Primary Examiner* — Abdullah A Riyami
*Assistant Examiner* — Syed M Kaiser
(74) *Attorney, Agent, or Firm* — Veros Legal Solutions, LLP

(57) ABSTRACT

A connector and a wireless controller for a wired lighting system are disclosed. The connector and wireless controller and connected via two wires. The connector also has at least one cap that covers two channels for electrically coupling additional two wires—one wire for connecting to a power supply and another wire for connecting to one or more lighting devices. The connector can be easily installed in an existing wired lighting system to retrofit the system with a wireless controller.

20 Claims, 18 Drawing Sheets

(56) References Cited

U.S. PATENT DOCUMENTS

| | | | |
|---|---|---|---|
| 2007/0173297 A1* | 7/2007 | Cho | H04M 1/22 455/574 |
| 2010/0029129 A1* | 2/2010 | Cox | H01R 4/2433 439/405 |
| 2010/0328852 A1* | 12/2010 | Johnson | H02G 3/00 361/641 |
| 2011/0062888 A1* | 3/2011 | Bondy | H05B 45/3725 315/294 |
| 2012/0001567 A1* | 1/2012 | Knapp | H04L 12/413 315/291 |
| 2012/0261487 A1 | 10/2012 | Palmer et al. | |
| 2013/0183042 A1* | 7/2013 | Knapp | H05B 47/195 398/106 |
| 2013/0200806 A1* | 8/2013 | Chobot | H05B 45/22 315/151 |
| 2014/0043807 A1* | 2/2014 | Shibusawa | F21V 23/005 362/235 |
| 2014/0111993 A1* | 4/2014 | Bertin | F21S 8/032 362/249.02 |
| 2015/0084515 A1* | 3/2015 | Altamura | H05B 47/115 315/131 |
| 2017/0022712 A1* | 1/2017 | Nelson, Jr. | E04D 13/032 |
| 2017/0054315 A1* | 2/2017 | Chien | F21V 15/01 |
| 2017/0082271 A1* | 3/2017 | Beausoleil | F21V 17/002 |
| 2017/0105272 A1* | 4/2017 | Johnson | H05B 47/185 |
| 2017/0271918 A1* | 9/2017 | Salerno | H01R 24/76 |
| 2018/0191087 A1* | 7/2018 | McGregor | H01R 9/031 |
| 2018/0249054 A1* | 8/2018 | Chien | H04N 5/2257 |
| 2018/0294464 A1* | 10/2018 | Mori | H01M 50/502 |
| 2018/0317755 A1* | 11/2018 | Aoki | A61B 1/051 |
| 2018/0325050 A1 | 11/2018 | Bye et al. | |
| 2019/0125905 A1* | 5/2019 | Weeks, Jr. | H05B 47/115 |
| 2019/0274206 A1* | 9/2019 | Altamura | H05B 47/19 |
| 2020/0097747 A1* | 3/2020 | Wang | G06K 9/00255 |

\* cited by examiner

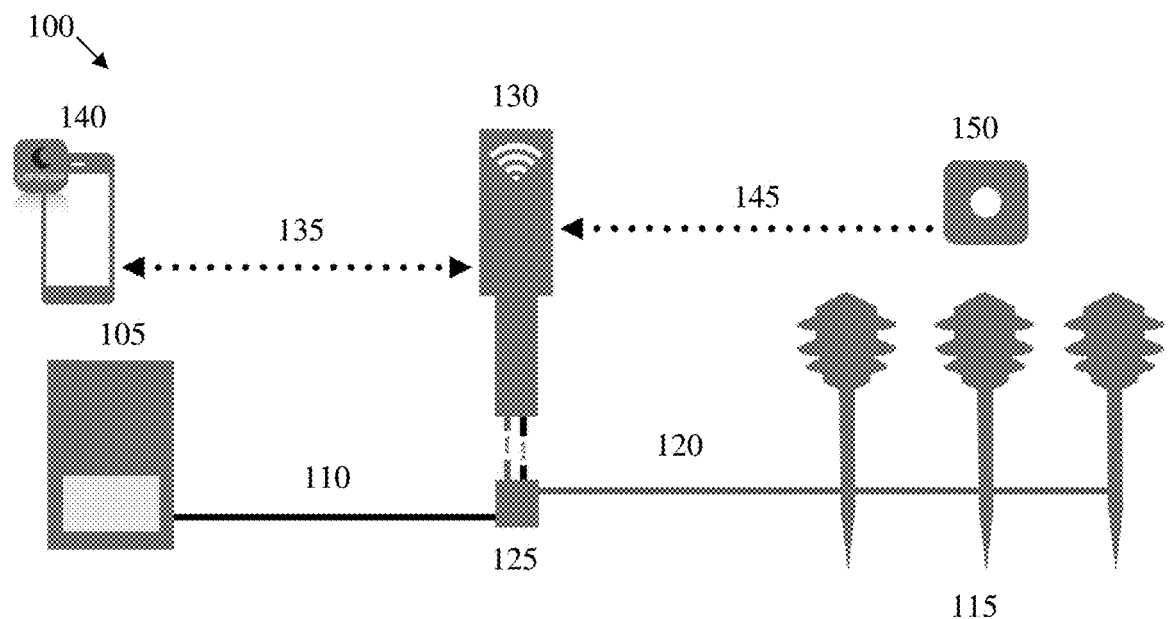
FIG. 19
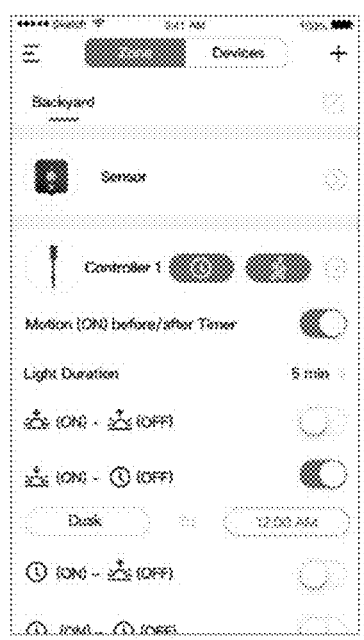 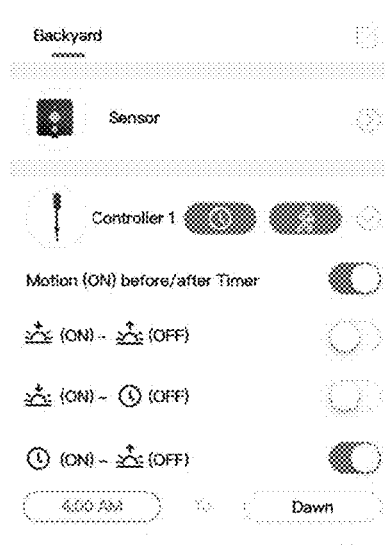 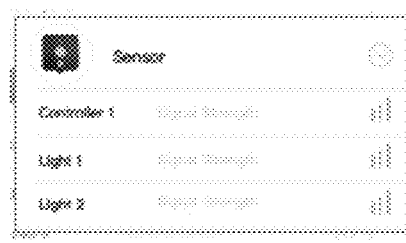
FIG. 20A         FIG. 20B         FIG. 20C

FIG. 29A  FIG. 29B
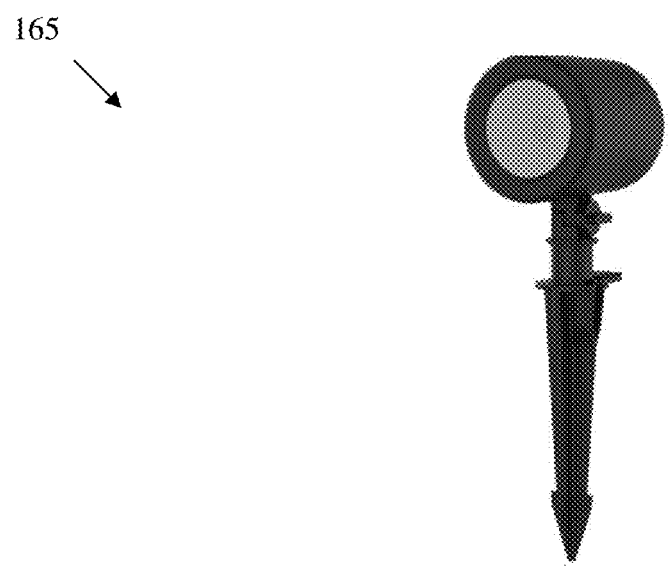
FIG. 30

CONNECTORS AND WIRELESS CONTROLLERS FOR WIRED LIGHTING SYSTEMS

FIELD OF THE INVENTION

The field of the invention is lighting systems, more specifically, connectors and wireless controllers for wired lighting systems.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Landscape lighting systems are well known in the art. Such systems typically comprise one or more lighting fixtures wired to a power supply such as a low-voltage transformer and a controller for programming on/off cycles and run times. U.S. Pat. No. 9,345,155 for example, describes a controller for an irrigation and lighting system that is removable from its housing. The controller can be mechanically and electrically disconnected from the housing and has a battery that allows a user to walk around the landscape site "to enable more convenient and intuitive programming of the ON and OFF times for the lighting fixtures." Column 4, lines 58-60. However, it appears the controller does not have the ability to wirelessly communicate with the housing and must be plugged back into the housing to execute the new on/off programming.

U.S. Pat. No. 9,526,152 describes a lighting fixture with an AC-to-DC power conversion unit and a controller built into the housing of the lighting fixture. The controller can wirelessly receive instructions from a remote unit or computing device via an RF signal to execute a pre-programmed on/off cycle. While advantageous in some respects, this approach requires that each lighting fixture have expensive electrical components such as the controller and AC-to-DC power conversion unit, which can increase costs significantly for larger landscape lighting systems that require numerous lighting fixtures.

U.S. Pat. No. 10,299,342 describes systems and methods for retrofitting a mechanical time clock-based lighting control system with a more feature-rich digital control system. Column 2, lines 65-67. This approach provides individually controllable relays coupled to the low voltage side of the power transformer. Column 3, lines 30-31. However, U.S. Pat. No. 10,299,342 fails to describe how the connection leads L1 and L2 are installed into an existing lighting system. It would be advantageous to provide a connector that facilitates installation of a wireless controller into an existing wired lighting system.

Thus, there remains a need for improved systems and methods to retrofit a wired lighting systems with wireless controllers.

SUMMARY OF THE INVENTION

The inventive subject matter provides apparatus, systems, and methods in which a connector is used to connect a wireless controller to a wired lighting system. The connector comprises a base portion and at least one cap that removably couples with the base portion. The cap is removed from the base portion to reveal a top surface of the base portion. The top surface of the base portion has two channels or slots for receiving two wires. Each channel has one or more electrically conductive teeth that pierce a shielding on the wire when the wire is pressed into the channel. A first wire is used for electrically coupling the connector to a transformer (e.g., power supply) and a second wire is used for electrically coupling the connector to one or more lighting devices (e.g., landscape lighting). In some embodiments, the connector has a first cap that covers the first channel and a second cap that covers the second channel. The underside of each cap can include one or more teeth to assist with aligning the wires in the channels.

The base portion also comprises an output port and an input port for establishing a circuit with a wireless controller. The first channel, which receives a current from the transformer, is electrically coupled with the input port. The second channel, which sends a current to the lighting devices, is electrically coupled with the output port. In this manner, when the input and output ports are connected with the wireless controller via a wired connection, the controller can control a current (e.g., on/off signal) that is sent to the lighting devices.

The first and second channels are electrically coupled with the input and output ports, respectively, via the electrically conductive teeth in each of the channels. A bottom cover on the underside of the base portion can be removed to reveal a third channel and a fourth channel with one or more electrically conductive teeth. When the bottom cover is attached to the base portion, the assembly provides a housing wherein the input port provides access to the third channel and the output port provides access to the fourth channel. A third and fourth wire can be pressed into the third and fourth channels so that the electrically conductive teeth pierce a shielding on the wires to establishing an electrical coupling between the first and third channels, and second and fourth channels. When a wireless controller is connected to the third wire via the input port and the fourth wire via the output port, a circuit between the transformer, connector, wireless controller, and lighting devices is established.

The controller is capable of wirelessly communicating with one or more electronic devices via a wireless communication protocol (e.g., WiFi®, Bluetooth®). The electronic device can comprise a computer (e.g., desktop computer, laptop, mobile phone, tablet, etc.) for controlling the signal to the lighting devices. The computer can include executable software instructions (e.g., apps, programs) that are programmed to configure settings and policies for managing the wired lighting system. The one or more electronic devices can also include a sensor, such as a motion sensor and/or a light sensor, or a wireless lighting device such as a battery powered or solar powered lighting device.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 19 is a schematic of a wired lighting system with a wireless controller communicatively coupled with a sensor and a computing device.

FIGS. 20A-20C are illustrations of a graphical user interface of the computing device of FIG. 19 for controlling timer and motion settings.

FIG. 29A is a perspective view of a lighting device of FIG. 19 and FIG. 25.

FIG. 29B is a perspective view of an alternative embodiment of a lighting device.

FIG. 30 is a perspective view of a wireless lighting device.

DETAILED DESCRIPTION

Figure 1:
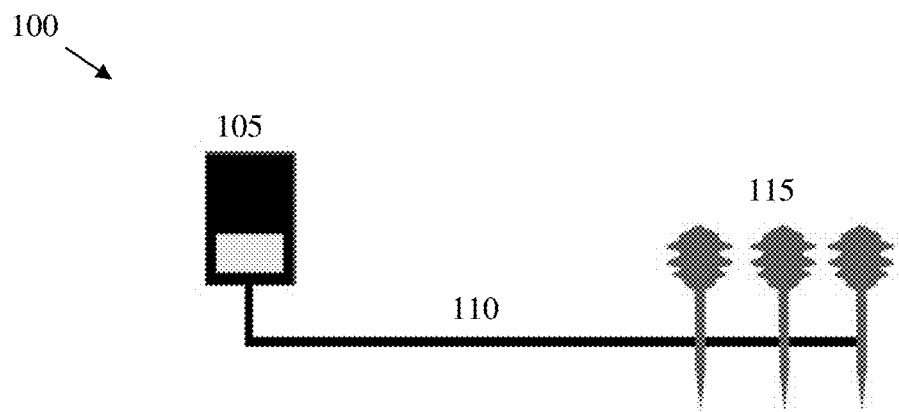
FIG. 1 is a schematic of a wired lighting system.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Two electronic devices that are "functionally coupled to" one another are coupled in a manner to allow data to pass from one electronic device to another electronic device via any wired or wireless means via any number of intermediary devices.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

FIG. 1 is a schematic of a wired lighting system 100 that has a transformer 105 (e.g., power supply) electrically connected with a plurality of lighting devices 115 via a wire 110. Transformer 105 provides a low-voltage signal to the lighting devices 115 via wire 110 to control an on/off state of the lighting devices 115. The on/off state of the lighting devices 115 must be controlled locally at the transformer 105 or at a wired controller connected with wire 110 (not shown).

Figure 2:
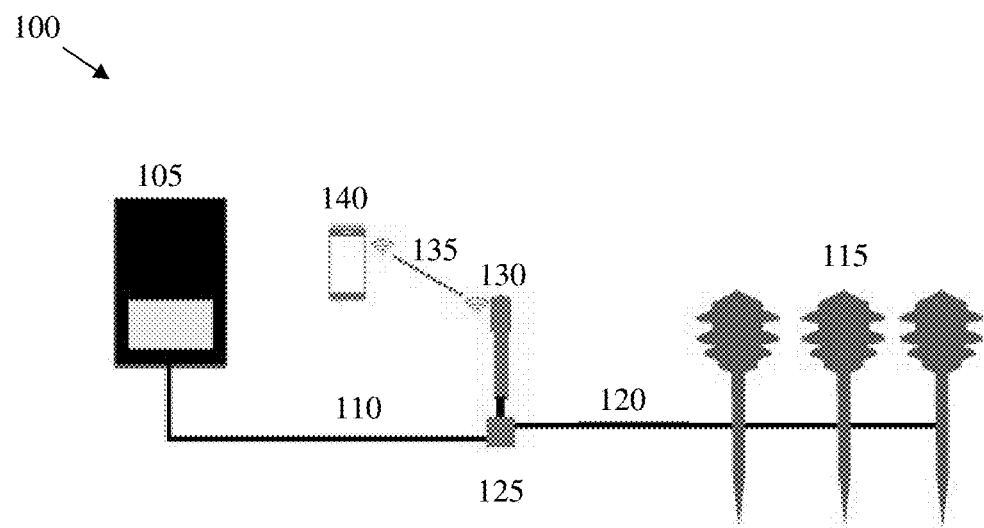
FIG. 2 is a schematic of a wired lighting system with a wireless controller.

FIG. 2 is a schematic of the wired lighting system 100 with a connector 125 electrically connected with wire 110 between transformer 105 and lighting devices 115. Connector 125 is electrically coupled with lighting devices 115 via wire 120. Connector 125 is also electrically connected with a wireless controller 130, which has a transceiver for sending and receiving signals via a wireless connection 135 to a computing device 140. Computing device 140 has a processor, non-transitory storage medium, and executable software instructions programmed to control an off/off state of the wireless controller. In this manner, a user can control an on/off state of the lighting devices 115 either locally via a wired controller or remotely via the wireless connection 135. Wireless connection 135 can be a local area network or a wide area network, including Bluetooth® and/or WiFi® protocols.

Figure 3:
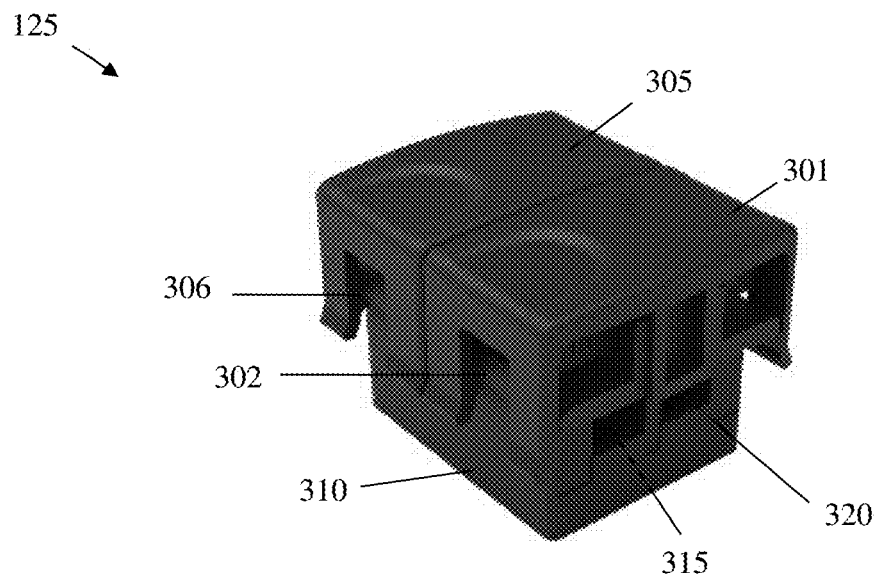
FIG. 3 is a perspective view of a connector for electrically coupling a wireless controller to a wired lighting system.

FIG. 3 is a perspective view of connector 125. Connector 125 is configured to be easily installed into the wired lighting system 100 so that a wired lighting system can be easily converted into a wirelessly controlled system. Connector 125 has a first cap 301 that can be removed from a base portion 310 to reveal a first channel 302. Wire 110 can be placed in the first channel 302 to electrically couple connector 125 to transformer 105. Connector 125 also has a second cap 305 that can be removed from the base portion 310 to reveal a second channel 306. Wire 120 can be placed in the second channel 306 to electrically couple connector 125 to the lighting devices 115. It is contemplated that in alternative embodiments the first cap 301 and the second cap 305 could be combined into one cap.

Base portion 310 has a port 315 and a port 320 for electrically connecting two additional wires for establishing a circuit between connector 125 and wireless controller 130, as described in more detail below.

Figure 4:
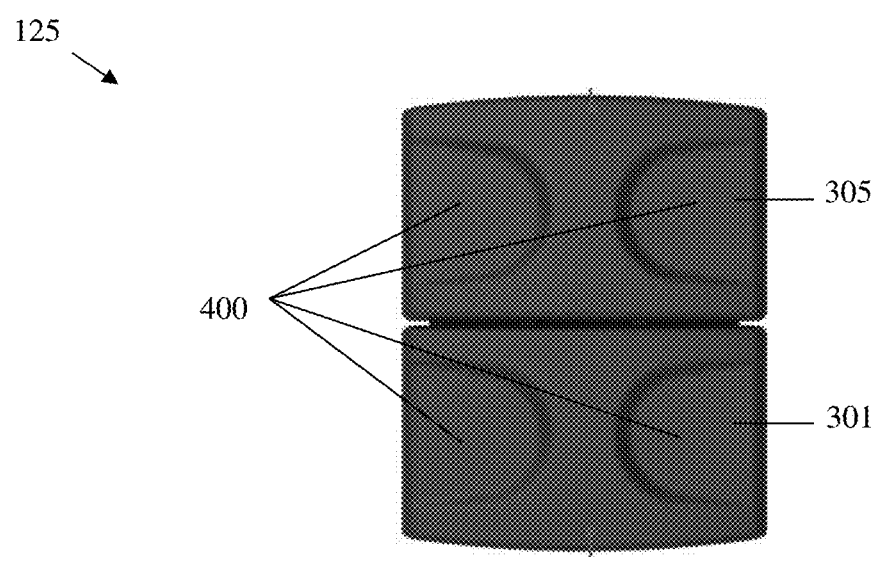
FIG. 4 is a top view of the connector of FIG. 3.

FIG. 4 is a top view of the first cap 301 and the second cap 305 of connector 125. First cap 301 and second cap 305 each have a pair of depressions 400 to facilitate their attachment and removal from base portion 310.

Figure 5:
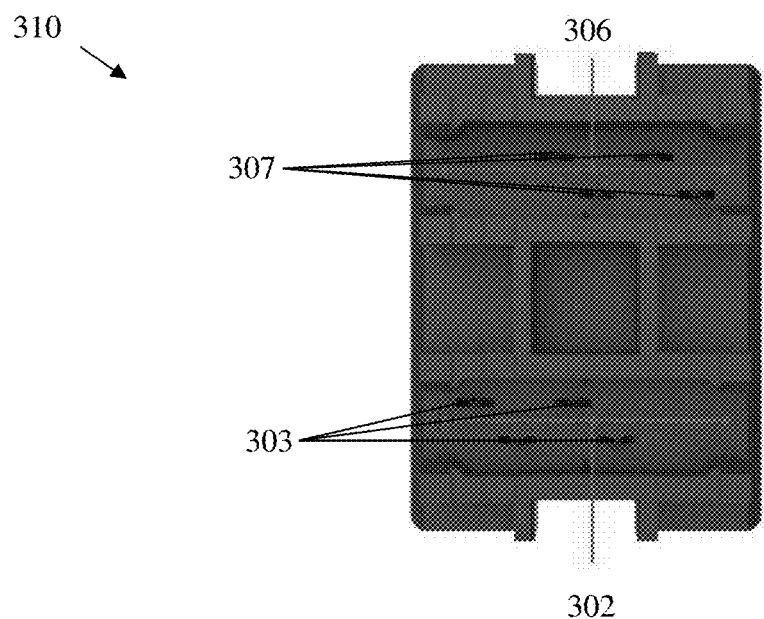
FIG. 5 is a top view of the base portion of the connector of FIG. 3 with the two caps removed.

FIG. 5 is a top view of the base portion 310 of connector 125 with the first cap 301 and the second cap 305 removed to reveal the first channel 302 and the second channel 306, respectively. The first channel 302 has one or more sharp teeth 303 and the second channel 306 has one or more sharp teeth 307. Teeth 303 and teeth 307 are made of an electrically conductive material and are sharp enough to pierce the shielding of wire 110 and wire 120 when they are pressed into first channel 302 and second channel 306, respectively.

Figure 6:
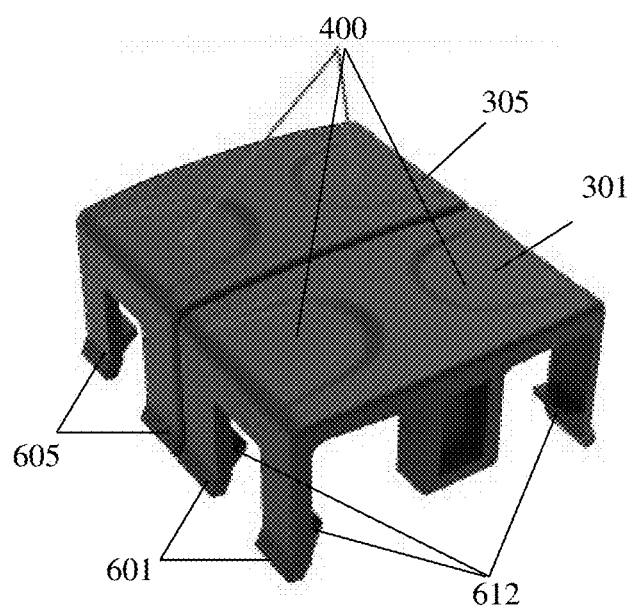
FIG. 6 is a perspective view of the two caps removed from the base portion of the connector of FIG. 3.

FIG. 6 is a perspective view of the first cap 301 and the second cap 305 showing their depressions 400. First cap 301 also has a plurality of legs 601 and second cap 305 has a plurality of legs 605. Legs 601 and legs 605 have tabs 612 for latching onto base portion 310.

Figure 7:
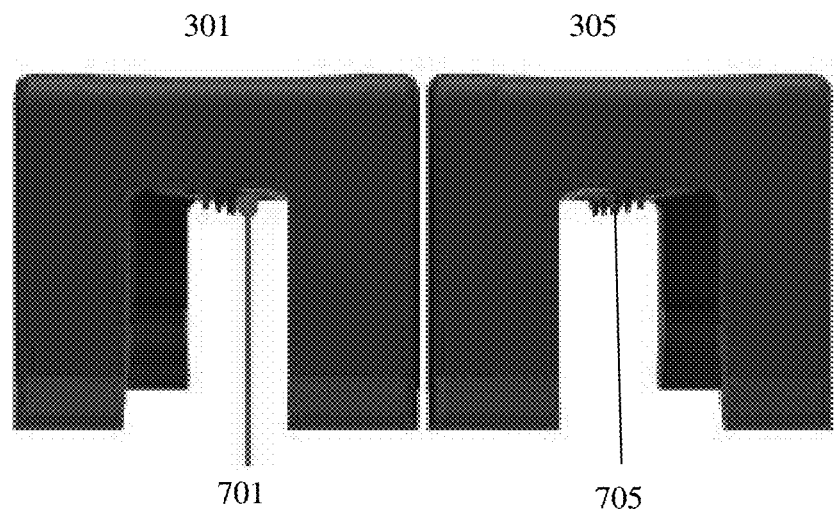
FIG. 7 is a front view of the two caps of FIG. 6.

FIG. 7 is a front view of first cap 301 and second cap 305. First cap 301 has one or more protrusions 701 and second cap 305 has one or more protrusions 705. Protrusions 701 and protrusions 705 help align wire 110 and wire 120, respectively, when wire 110 is placed in the first channel 302 and wire 120 is placed in the second channel 306. For example, protrusions 701 and protrusions 705 can be sized and dimensioned to fit within a longitudinal groove in wire 110 and wire 120.

Figure 8:
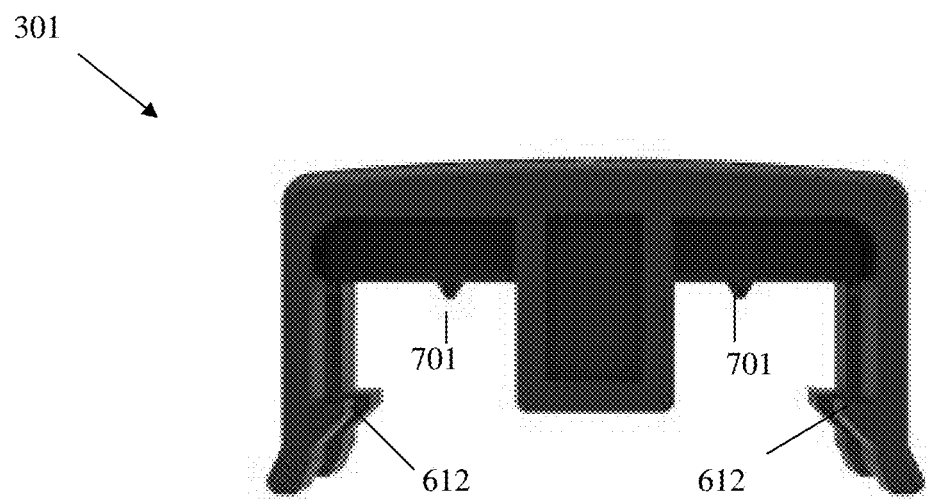
FIG. 8 is a side view of the first cap of FIG. 6.

FIG. 8 is a side view of the first cap 301, showing protrusions 701 and tabs 612 for latching onto base portion 310.

Figure 9:
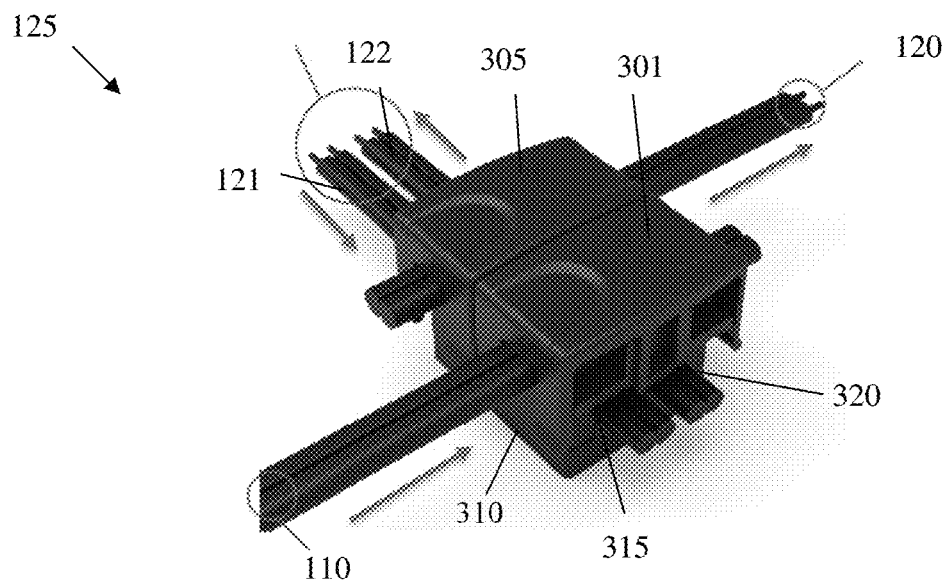
FIG. 9 is a perspective view of the connector of FIG. 3 connected with four wires.

FIG. 9 is a perspective view of connector 125 connected with wire 110, wire 120, wire 121, and wire 122. Wire 110 electrically connects connector 125 to transformer 105. Wire 120 electrically connects connector 125 to lighting devices 115. Wire 121 is placed in port 315 of connector 125 and electrically connects connector 125 to wireless controller 130 as a receive signal. Wire 122 is placed in port 320 of connector 125 and electrically connects connector 125 to wireless controller 130 as a send signal.

Figure 10:
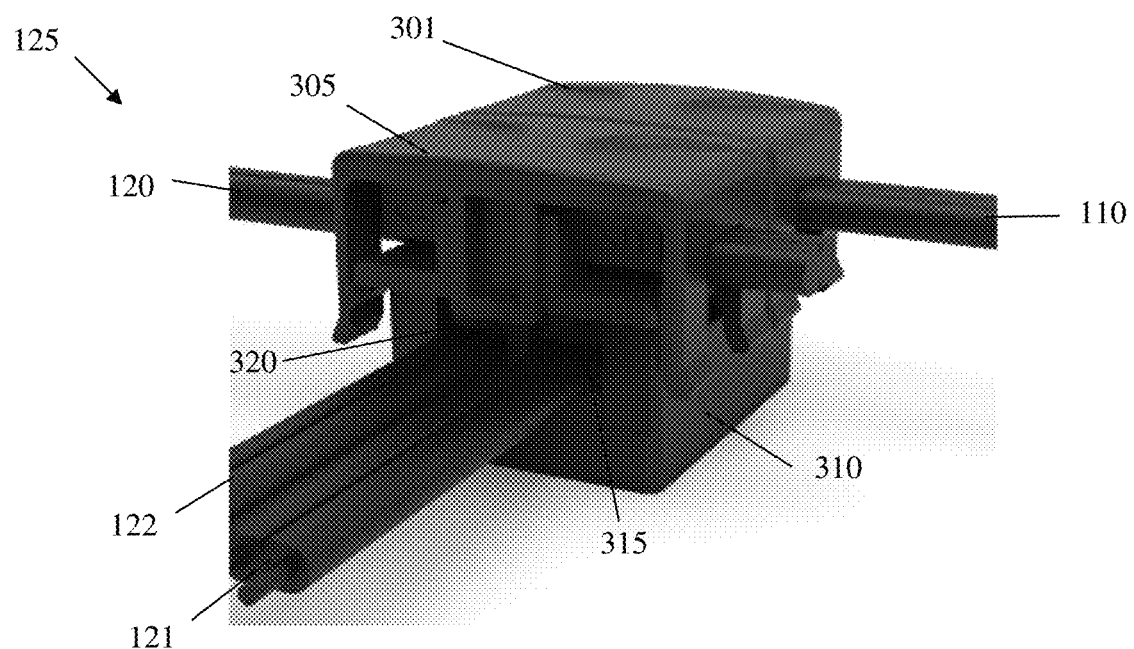
FIG. 10 is another perspective view of the connector of FIG. 9.

FIG. 10 is a different perspective view of connector 125 connected with wire 110, wire 120, wire 121, and wire 122.

Figure 11:
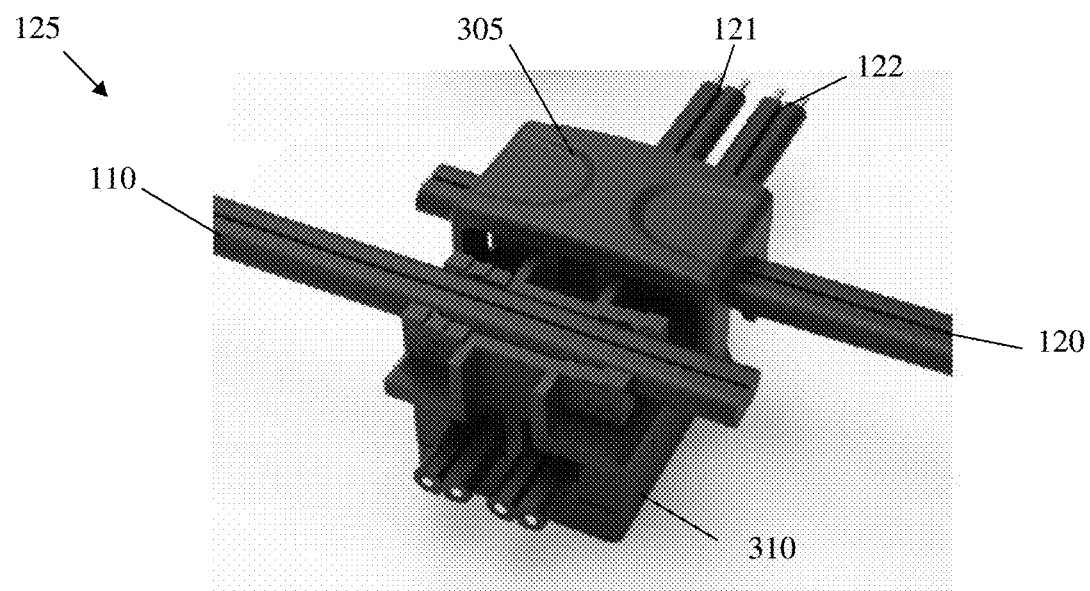
FIG. 11 is a perspective view of the connector of FIG. 9 with a cap removed.

FIG. 11 is a perspective view of connector 125 connected with wire 110, wire 120, wire 121, and wire 122 and with the first cap 301 removed.

Figure 12:
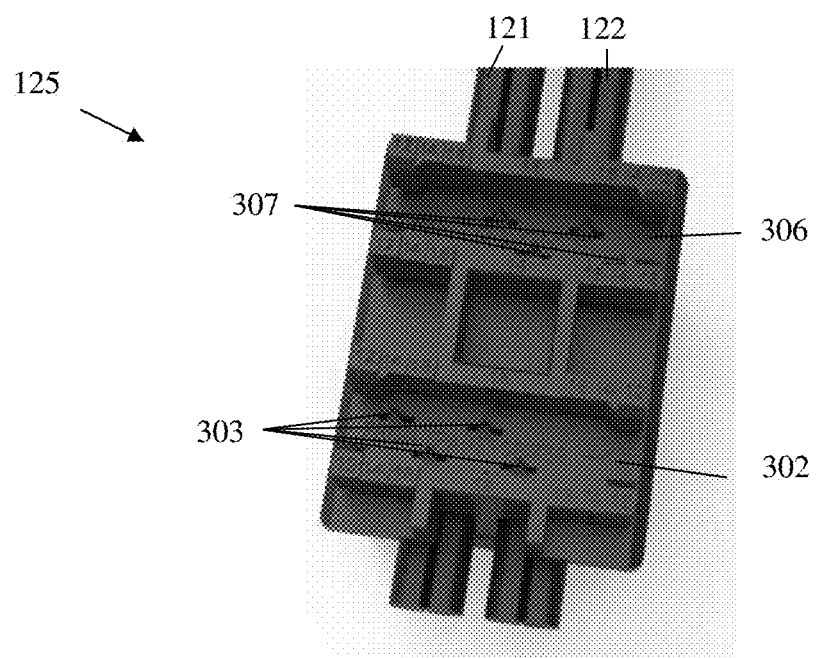
FIG. 12 is a top perspective view of the connector of FIG. 9 with both caps removed and two wires removed.

FIG. 12 is a top perspective view of connector 125 with the first cap 301, the second cap 305, wire 110 and wire 120 removed. First channel 302 has one or more teeth 303 for establishing an electrical connection with port 320 and wire 122. Second channel 306 has one or more teeth 307 for establishing an electrical connection with port 315 and wire 121.

Figure 13:
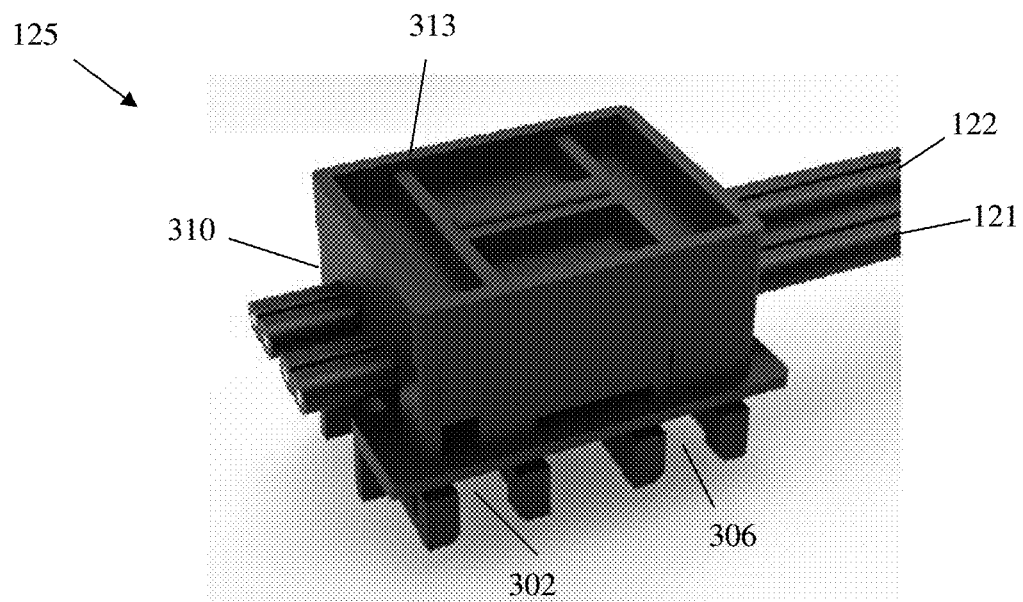
FIG. 13 is a bottom perspective view of the connector of FIG. 12.
Figure 14:
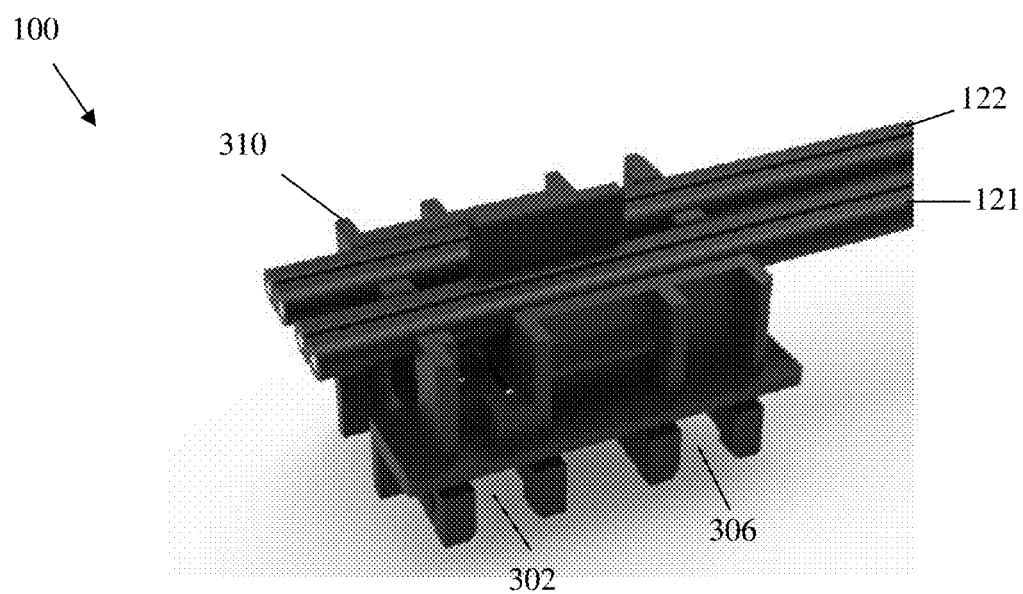
FIG. 14 is a bottom perspective view of the connector of FIG. 12 with the bottom cover of the base portion removed.
Figure 15:
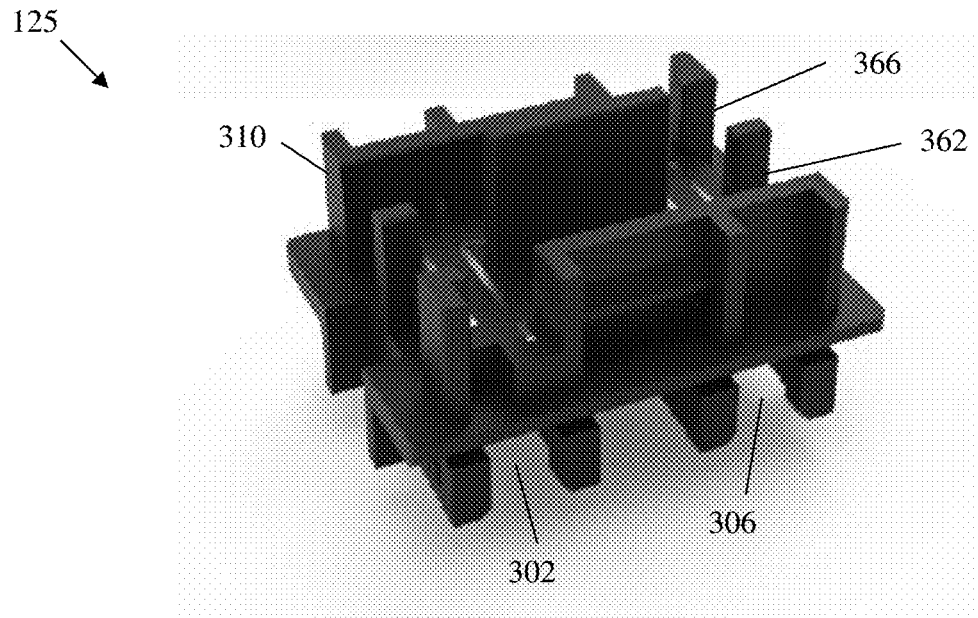
FIG. 15 is a bottom perspective view of the connector of FIG. 14 with all four wires removed.

FIG. 13 is a bottom perspective view of the base portion 310 of connector 125. Base portion 310 has a bottom cover 313 that can be removed to reveal a third channel 362 associated with port 315 and a fourth channel 366 associated with port 320 (see FIG. 15). FIG. 14 is a bottom perspective view of connector 125 with the bottom cover 313 removed from base portion 310. FIG. 15 is a bottom perspective view of connector 125 with the bottom cover 313 removed from base portion 310 and with wire 110, wire 120, wire 121 and wire 122 removed, and with third channel 362 and fourth channel 366 shown. Third channel 362 and fourth channel 366 have teeth 304 and teeth 308, respectively.

Figure 16:
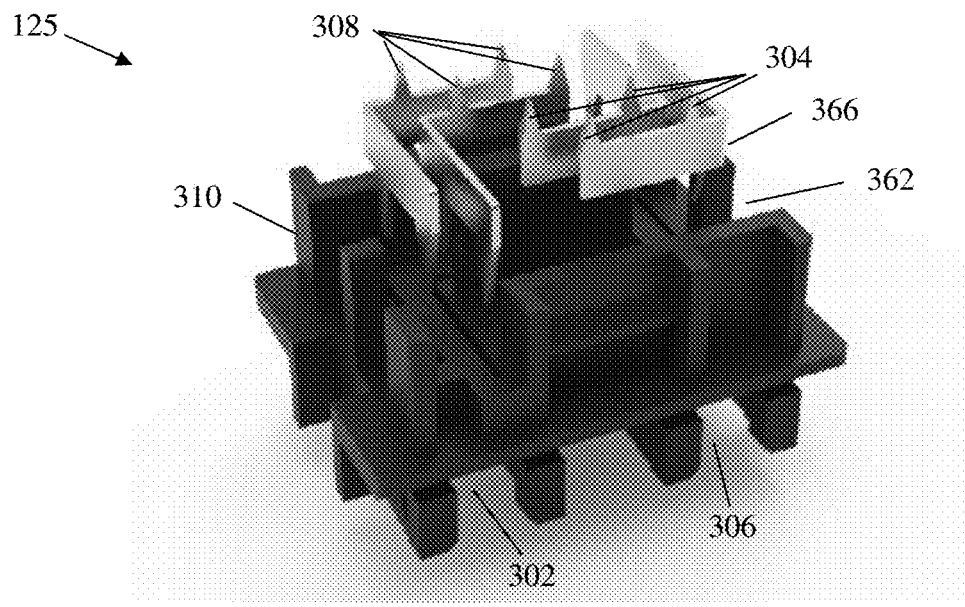
FIG. 16 is a bottom perspective exploded view of the connector of FIG. 15 showing the electrically conductive teeth removed from the channels.

FIG. 16 is a bottom perspective exploded view of connector 125 showing the electrically conductive teeth 304 and 308 removed from channels 362 and 366, respectively. Teeth 304 are formed on an underside of brass angular brackets and opposite to teeth 307 on the top side of the angular brackets. Teeth 304 protrude into channel 362 just as teeth 307 protrude into channel 306, thus electrically coupling channel 306 with channel 362. Likewise, teeth 308 are formed on an underside of brass angular brackets and opposite to teeth 303 on the top side of the angular brackets, thus electrically coupling channel 302 with channel 366. The brass angular brackets have a height that is about the distance of separation between the two levels of channels in base portion 310.

Figure 17:
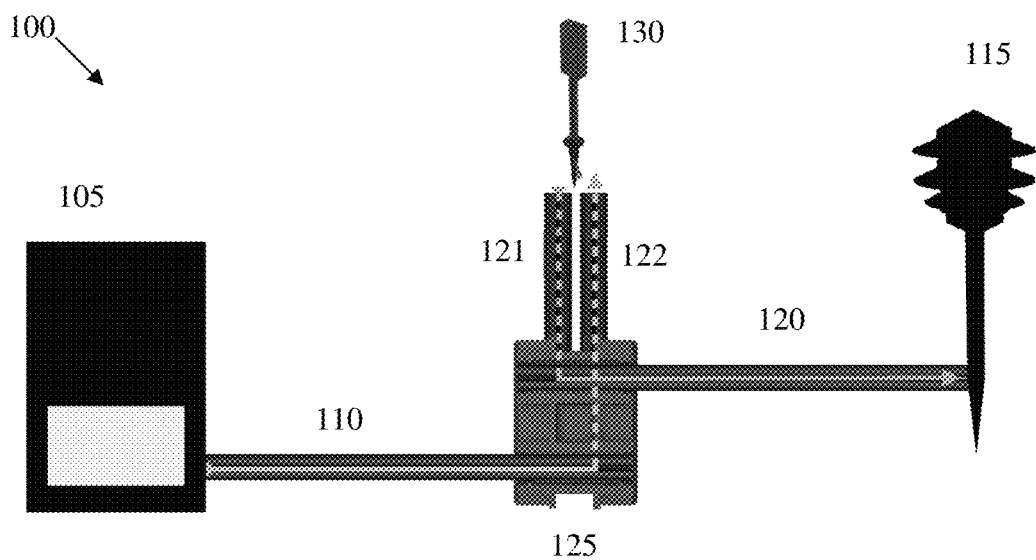
FIG. 17 is a schematic of a wired lighting system with the connector of FIG. 3 connected to a wireless controller.

FIG. 17 is a schematic of wired lighting system 100 comprising transformer 105, connector 125, wireless controller 130, and lighting devices 115, with arrows showing the direction of the current and control signal. A low voltage current originates from transformer 105 and travels to connector 125 via wire 110. The current travels from connector 125 to wireless controller 130 via the first channel 302, teeth 303, teeth 308, fourth channel 366, port 320, and wire 122. The control signal travels from wireless controller 130 back to connector 125 via wire 121, port 315, third channel 362, teeth 304, and the second channel 306. The signal then travels from connector 125 to lighting devices 115 via second channel 306 and wire 120.

Connector 125 can be easily installed in an existing wired lighting system by turning off the power source, cutting the existing wire at a point between the transformer and the lighting devices, placing the transformer wire into the first channel 302, placing the lighting device wire into the second cannel 306, pressing the first cap 301 over first channel 302 to pierce the transformer wire, and pressing the second cap 305 over second channel 306 to pierce the lighting device wire. In this manner, controller 130 can be easily installed into an existing wired lighting system to retrofit the system for remote and wireless control.

Figure 18A:
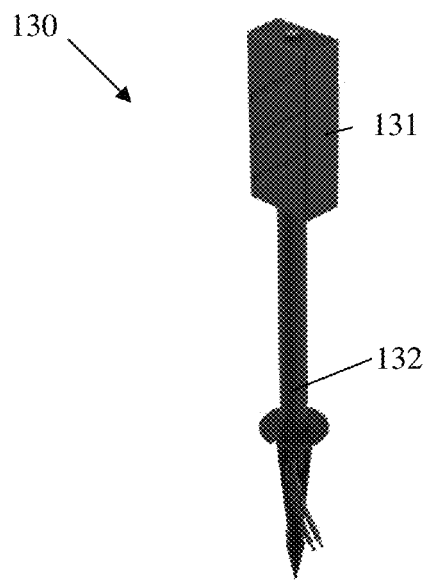
FIG. 18A is a perspective view of the wireless controller in FIG. 17.
Figure 18B:
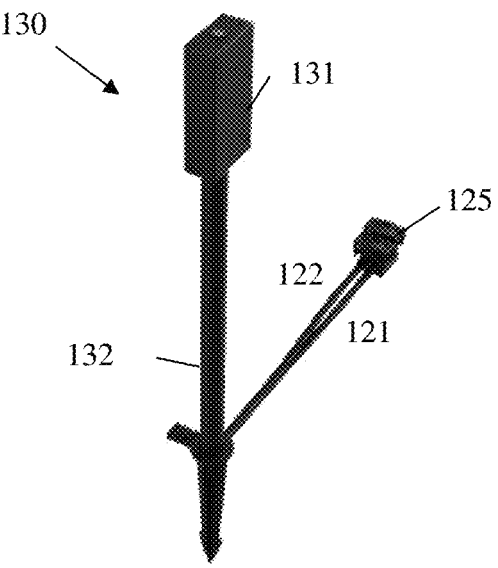
FIG. 18B is a perspective view of the wireless controller and connector of FIG. 17.

FIG. 18A is a perspective view of the wireless controller 130. Wireless controller 130 comprises a transceiver 131 for sending and receiving wireless communications to an electronic device such as a computer or sensor. Wireless controller 130 also comprises a stake 132 for mounting wireless controller 130 to landscape. Alternatively, wireless controller 130 could have another type of fastener (e.g., adhesive, magnet, screws, etc.) for mounting to different types of surfaces or structures. FIG. 18B is a perspective view of wireless controller 130 electrically coupled with connector 125 via wire 121 and wire 122. Wireless controller 130 also houses a memory and processor chip for storing settings and data.

FIG. 19 is a schematic of wired lighting system 100 with wireless controller 130 communicatively coupled with a computing device 140 via a wireless communication link 135. Wireless controller 130 is also communicatively coupled with a sensor 150 via wireless communication link 145.

FIG. 20A is an illustration of a graphical user interface of the computing device 140. The interface shows a button for zones and devices. On the zone interface, there is a list of zones (e.g., "backyard") and quick buttons for controller, timer, and motion. The clock button next to "controller 1" activates the current timer settings for controller 1. The walking person button next to "controller 1" activates motion detection for controller 1. When the timer button is off, then motion detection will activate lighting at night. When the timer button is on, motion detection will activate lighting outside of the timer or dusk/dawn range setting.

Below "controller 1" is a toggle button for "Motion (ON) before/after timer." When this button is on, motion activation of the light can quickly be deactivated by pressing the walking person button next to "controller 1." The "light duration" setting provides the time that the lights will remain on after motion is detected (e.g., "5 min").

FIG. 20B is an illustration of a graphical user interface of the computing device 140. The interface is similar to FIG. 20A except for different dusk/dawn timer settings. For example, the interface of FIG. 20A is set to turn lights on at dusk and turn off lights at 12 am. The interface of FIG. 20B is set to turn lights on at 4 am and turn lights off at dawn. Various combinations of dusk/dawn timer settings are available from the interface, including dusk-to-time, dusk-to-dawn, time-to-dawn, and time-to-time.

FIG. 20C is an illustration of the sensor setting. Clicking on sensor will display a signal strength between the sensor and the devices.

Figure 21:
FIG. 21 is an illustration of a graphical user interface of the computing device of FIG. 19 for controlling timer and motion settings.

FIG. 21 is an illustration of the graphic user interface with arrows indicating how the selection of "light duration" and "12:00 am" reveal additional windows. From the "light duration settings" window, the user can select 5 min, 10 min, 15 min, 20 min, and 30 min. From the "Set Time" window, the user can select hours, minutes, and AM/PM.

Figure 22:
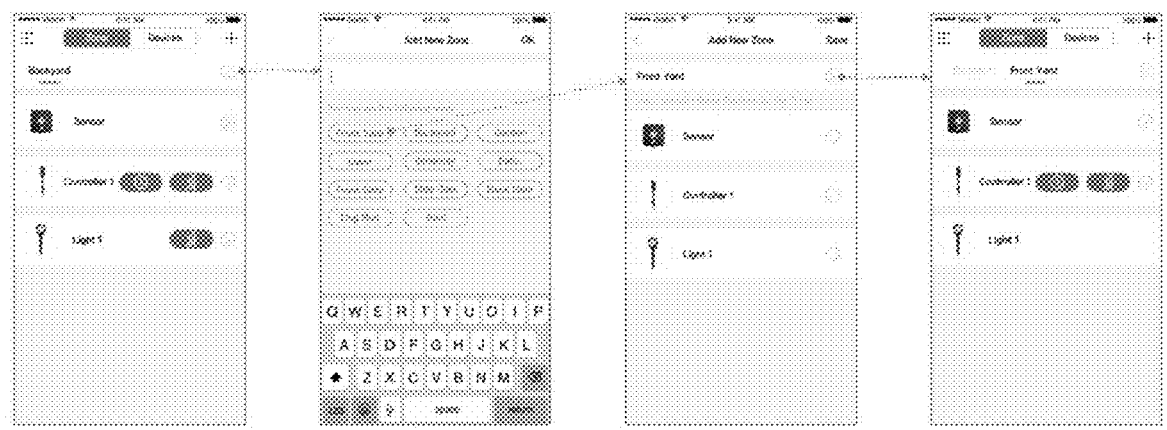
FIG. 22 is an illustration of a graphical user interface of the computing device of FIG. 19 for adding new zones and renaming zones.

FIG. 22 is an illustration of the graphical user interface with arrows indicating how to add new zones. Pressing the "+" symbol opens a window for adding a new zone or device. The name of the new zone or device can be edited using the paper and pencil icon to the right of the zone or device name (e.g., "backyard").

Figure 23:
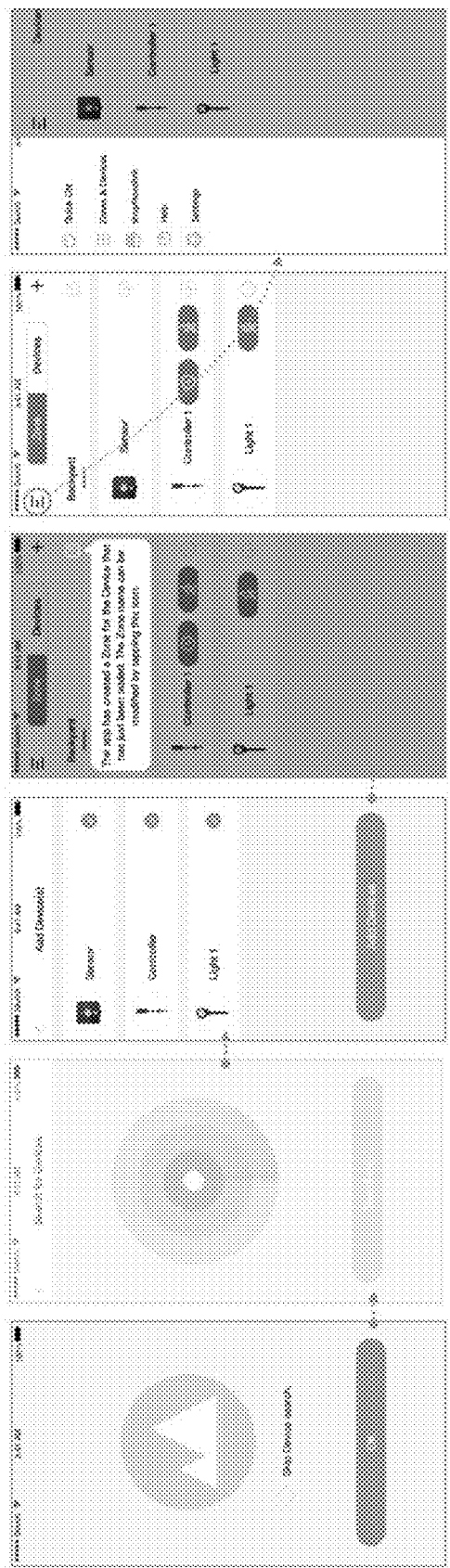
FIG. 23 is an illustration of a graphical user interface of the computing device of FIG. 19 for searching for new devices and adding new devices.

FIG. 23 is an illustration of the graphical user interface for adding new devices to the lighting system. The user can select "ok" to search for new devices. The app will search for available devices either via a wired or wireless connection. When the first device is added, a first zone is automatically created for that device.

Figure 24:
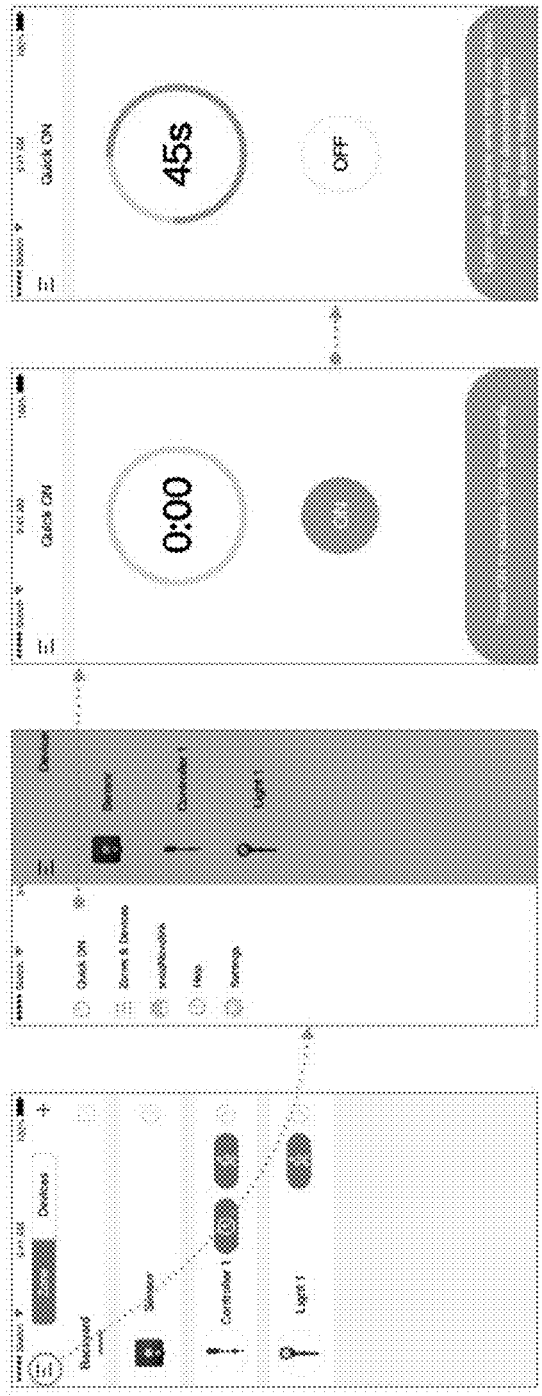
FIG. 24 is an illustration of a graphical user interface of the computing device of FIG. 19 for quickly turning all devices on and off.

FIG. 24 shows a continuation of the graphical user interface of FIG. 23. When the menu icon in the top left is selected, a left panel window is displayed with a "Quick ON" or button. When this button is selected, a window with a timer and an "ON" button is shown. Selecting the "ON" button will turn lights on until the timer runs out. The user can select the "OFF" button to turn the lights off before the timer runs out.

Figure 25:
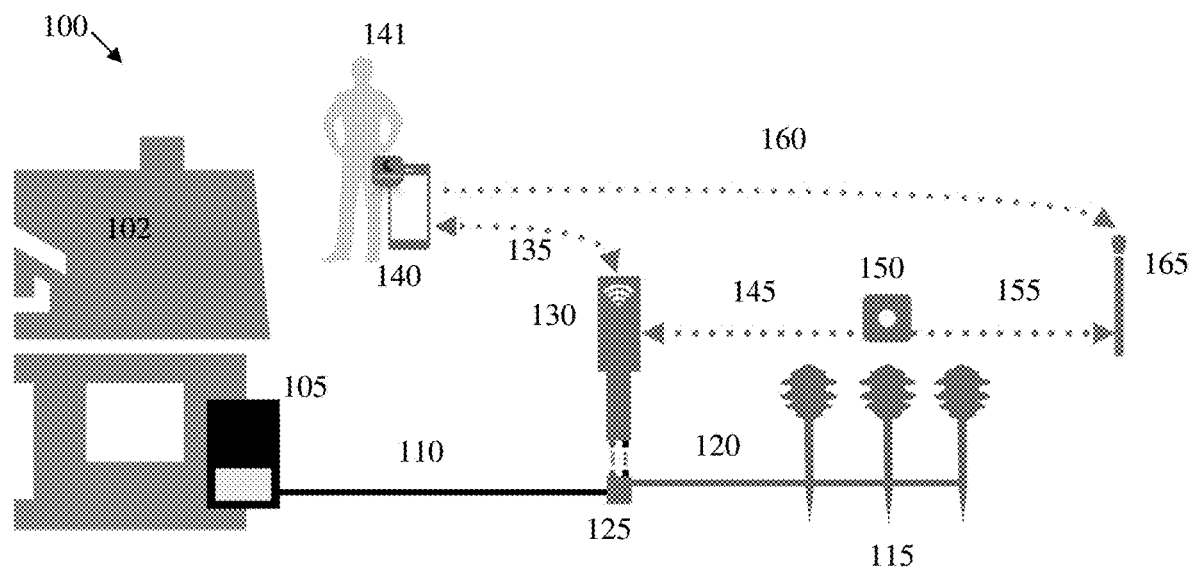
FIG. 25 is a schematic of a wired lighting system being wirelessly controlled by a user via the wireless controller and the connector of FIG. 3.

FIG. 25 is a schematic of wired lighting system 100 installed at a house 102. House 102 provides an alternating current (AC) power supply and transformer 105 converts the AC current into a lower voltage power source for powering wired lighting system 100. Wired lighting system 100 includes a wireless controller 130, which not only allows for wired lighting devices 115 to be controlled wirelessly, but also allows for the expansion of wired lighting system 100 to include additional wireless components such as wireless lighting device 165. Wireless lighting device 165 can be directly controlled by a user 141 via computing device 140 and wireless communication link 160. Alternatively, wireless lighting device 165 can be controlled by user 141 using computing device 140 and wireless controller 130 via wireless communication link 145, sensor 150, and wireless communication link 155. The addition of lighting device 165 to wired lighting system 100 allows for existing wired systems to be expanded to include newer wireless lighting devices and components. Moreover, it is contemplated that wired lighting system 100 can be further modified to include multiple controllers 130 to control different groups of lighting devices 115 with different on/off program cycles.

Figure 26:
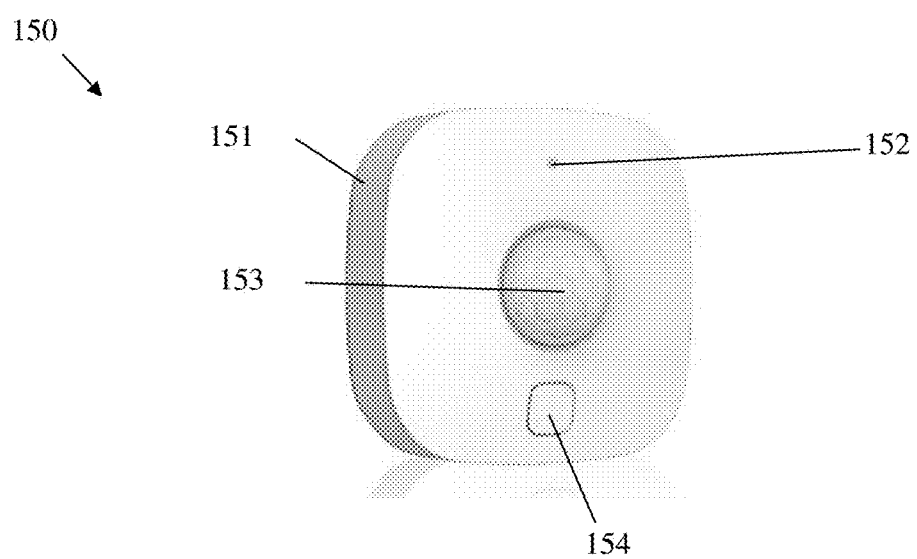
FIG. 26 is a front perspective view of the sensor of FIG. 19 and FIG. 25.

FIG. 26 is a front perspective view of sensor 150. Sensor 150 has a housing 151 for storing and protecting electronic components from weather conditions. Sensor 150 also has a light sensor 152 and a motion sensor 153. Sensor 150 also has a button 154 for turning the device on/off and for pairing the device with the wireless controller 130 to establish communication link 145. Button 154 can also be used to pair sensor 150 with other devices such as wireless lighting device 165.

Figure 27:
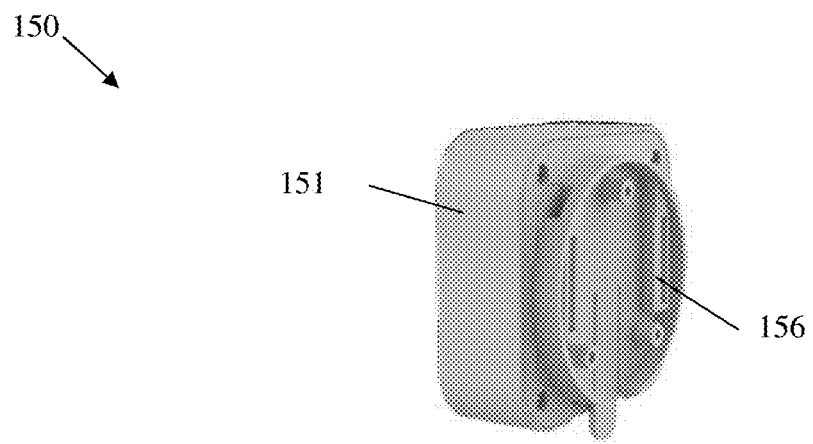
FIG. 27 is a rear perspective view of the sensor of FIG. 19 and FIG. 25.

FIG. 27 is a rear perspective view of sensor 150 showing a removable rear cover 156 and fastening features for mounting sensor 150 to a surface.

Figure 28:
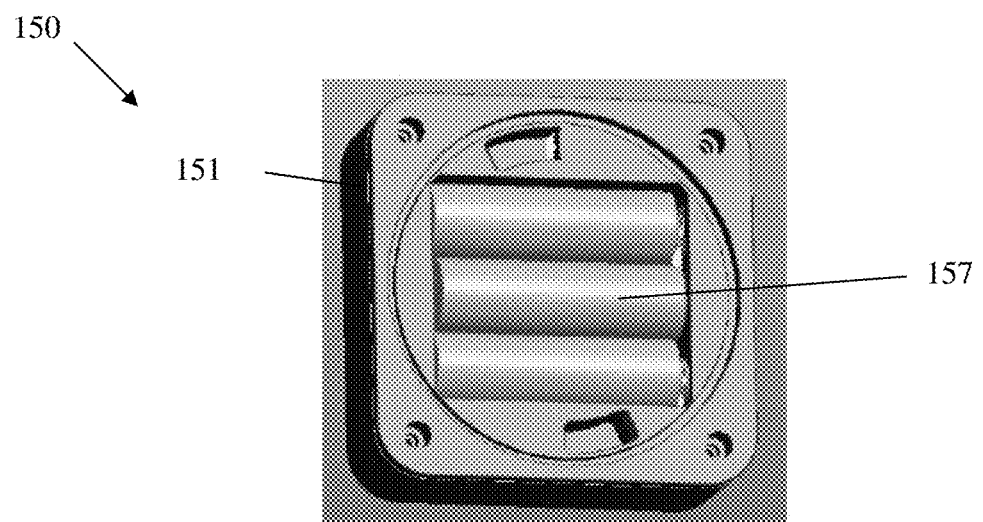
FIG. 28 is a rear perspective view of the sensor of FIG. 19 and FIG. 25 with a rear cover removed.

FIG. 28 is a rear perspective view of sensor 150 with rear cover 156 removed to reveal batteries 157.

FIG. 29A is a perspective view of a lighting device 115.

FIG. 29B is a perspective view of a lighting device 116 having an alternative exterior design to lighting device 115 but similar function.

FIG. 30 is a perspective view of a wireless lighting device 165. Wireless lighting device 165 does not require any external wiring for power or for communicating with wireless controller 130. Instead, wireless lighting device 165 includes a power supply (e.g., solar powered, or batteries) and a transceiver for sending and receiving communication signals with other devices, including wireless controller 130, sensor 150, and computing device 140.

Figure 31:
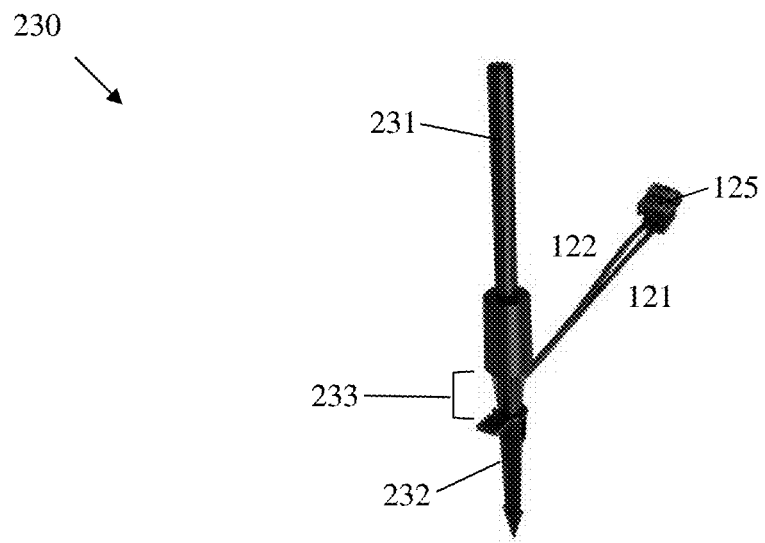
FIG. 31 is a top perspective view of another embodiment of a wireless controller.
Figure 32:
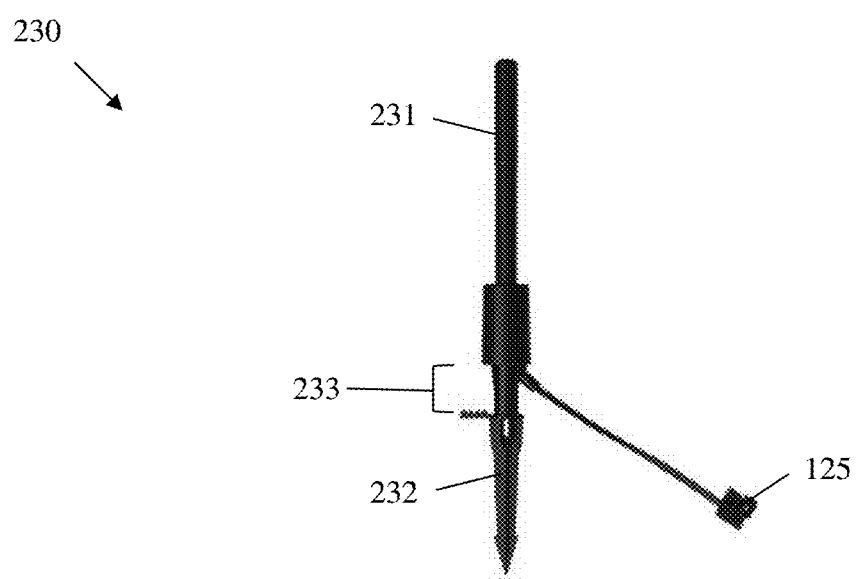
FIG. 32 is a side perspective view of the wireless controller of FIG. 31.

FIG. 31 is a top perspective view of another embodiment of a wireless controller 230. Wireless controller 230 comprises a transceiver 231 for sending and receiving wireless communications to an electronic device such as a computer or sensor. Wireless controller 230 also comprises a stake 232 for mounting wireless controller 230 to landscape. Wireless controller 230 is electrically coupled with connector 125 via wire 121 and wire 122 at a point located above the head of stake 232 by a distance 233. Distance 233 can be 5 cm, 10 cm, 20 cm or greater, to keep wire 121, wire 122, and any related electronic components above any rainwater and/or flooding. FIG. 32 is a side perspective view of wireless controller 230.

Figure 33:
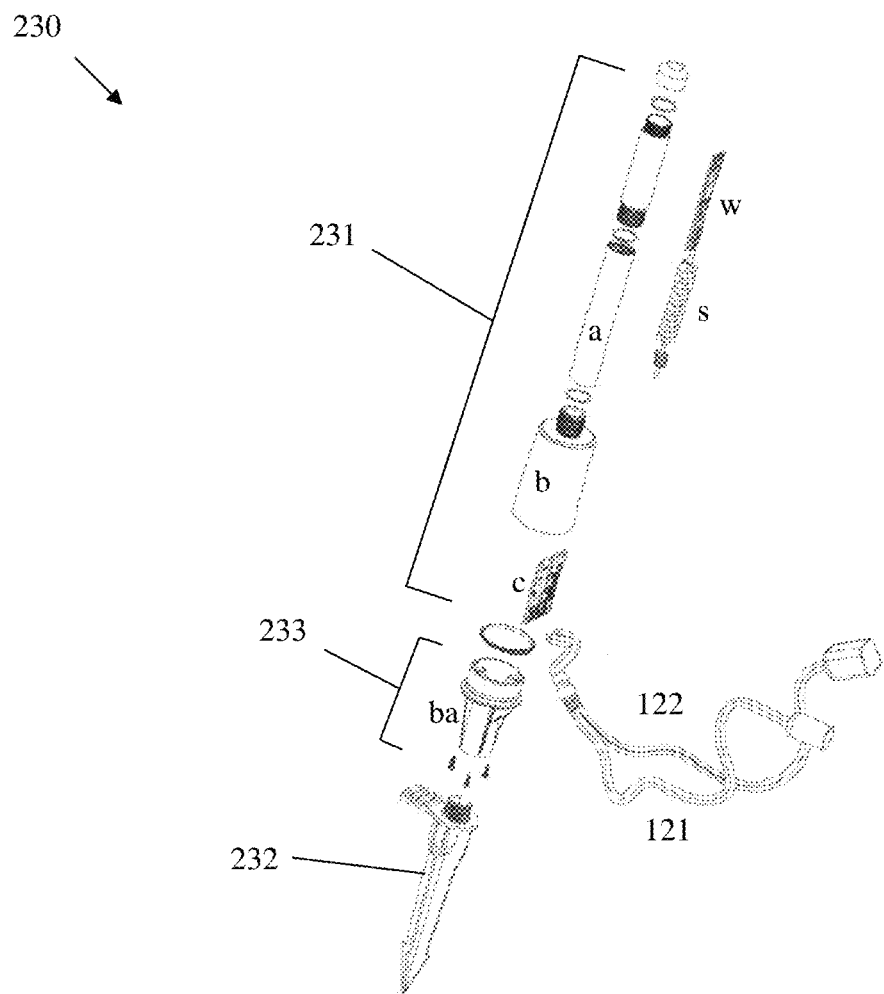
FIG. 33 is an exploded view of the wireless controller of FIG. 31.
Figure 34:
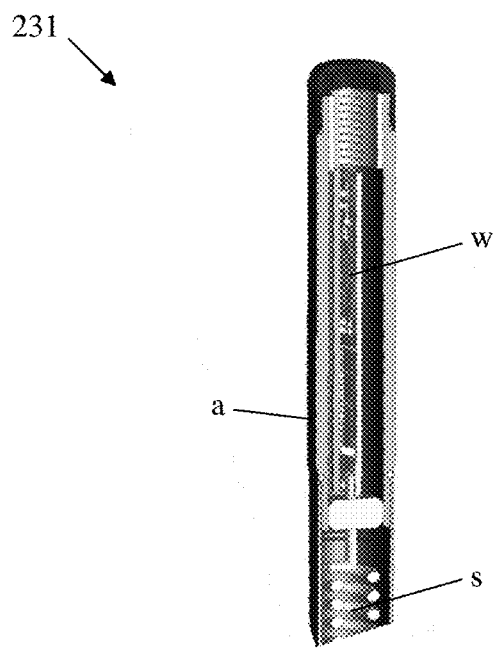
FIG. 34 is a cross-sectional view of the wireless controller of FIG. 31

FIG. 33 is an exploded view of wireless controller 230. Transceiver 231 comprises an elongated antenna housing (a) coupled with a controller body (b). Controller body (b) houses a processor, memory, and non-transitory storage medium for saving user settings, user profiles, and lighting programs. FIG. 34 is a cross-sectional view of transceiver 231, showing the wireless connection (w) and signal wire (s) disposed inside the antennal housing (a). The electronics are sealed inside the antenna housing (a) using silicon seal rings, threaded fasteners, and a cap. This design provides improved insulation of the electronics from weather protection. The design also advantageously places the antenna portion of the controller highest above ground for better signaling and places the controller body (b) (with the electrical components) lower to the ground to be less obtrusive. Another advantage of the present design is that the controller base (ba) separates the controller body (b) from the head of stake 232 to lower possibility of damage while hammering the stake and to keep the electronics above ground, and above any rain water and/or flooding.

The devices, systems, and methods described herein provide the technical advantage of retrofitting an existing wired lighting system with a wireless controller by providing a connector that can be easily installed onto existing wires.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A connector for converting a wired lighting system into a wireless lighting system comprising:
   a base portion comprising a first channel electrically coupled with a first port, a second channel electrically coupled with a second port, a third channel electrically couple to a third port, and a fourth channel electrically coupled with a fourth port;
   at least one cap that removably couples with the base portion and is configured to cover the first channel and the second channel;
   a bottom cover that removable couple with the base portion and is configured to cover the third and fourth channel;
   a first plurality of teeth electrically connecting a first wire in the first channel with a fourth wire in the fourth channel; and
   a second plurality of teeth electrically connecting a third wire in the third channel with a second wire in the second channel.

2. The connector of claim 1, further comprising a controller electrically coupled with the first port and the second port.

3. The connector of claim 2, wherein the controller is capable of wirelessly communicating with an electronic device via a wireless communication protocol.

4. The connector of claim 3, wherein the electronic device comprises a sensor.

5. The connector of claim 4, wherein the sensor is at least one of a motion sensor and a light sensor.

6. The connector of claim 3, wherein the electronic device comprises at least one of a mobile phone, a tablet, and a computer.

7. The connector of claim 6, wherein the electronic device comprises executable software instructions programmed to configure the controller.

8. The connector of claim 3, wherein the electronic device comprises a lighting device.

9. The connector of claim 8, wherein the lighting device is battery-powered or solar powered.

10. The connector of claim 2, wherein the controller receives a low-voltage electric current from the first port and the first channel.

11. The connector of claim 10, wherein the controller sends a control signal to the second port for controlling an on/off state of the second channel.

12. The connector of claim 11, wherein the first channel is electrically coupled with a low-voltage power supply via a first wire and the second channel is electrically coupled with a lighting device via a second wire.

13. The connector of claim 1, wherein the first and second channels each comprise one or more teeth for piercing a shielding of a wire to establish an electrical coupling between the base portion and an electrical wire.

14. The connector of claim 1, wherein the at least one cap comprises a first cap for covering the first channel and a second cap for covering the second channel.

15. The connector of claim 1, wherein the cap comprises one or more teeth for aligning a wire with at least one of the first channel and the second channel.

16. The connector of claim 1, wherein the cap comprises one or more tabs for removably coupling the cap onto the base portion.

17. The connector of claim 1, wherein an outer surface of the cap comprises one or more depressions.

18. A lighting system comprising;
a power supply;
one or more lighting devices;
a controller for controlling an on/off status of the one or more lighting devices; and
the connector of claim 1, wherein the first channel is electrically coupled with the power supply, the second channel is electrically coupled with the one or more lighting devices, and the first port and the second port are electrically coupled with the controller.

19. The lighting system of claim 18, further comprising a portable computer wirelessly coupled with the controller.

20. The lighting system of claim 19, wherein the portable computer comprises executable software instructions programmed to configure one or more operational attributes of the controller.

* * * * *